June 9, 1931. J. E. SMITH 1,809,572
APPARATUS AND PROCESS FOR TEXTURING BRICK
Filed Jan. 28, 1929
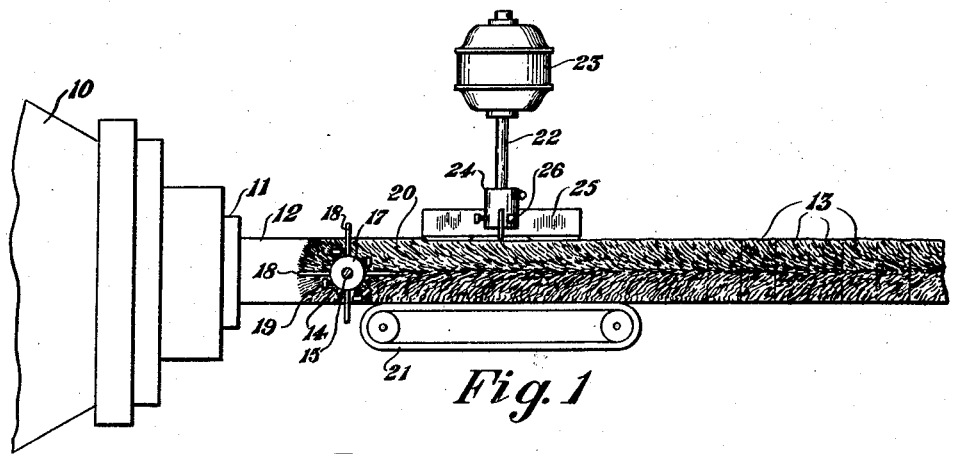
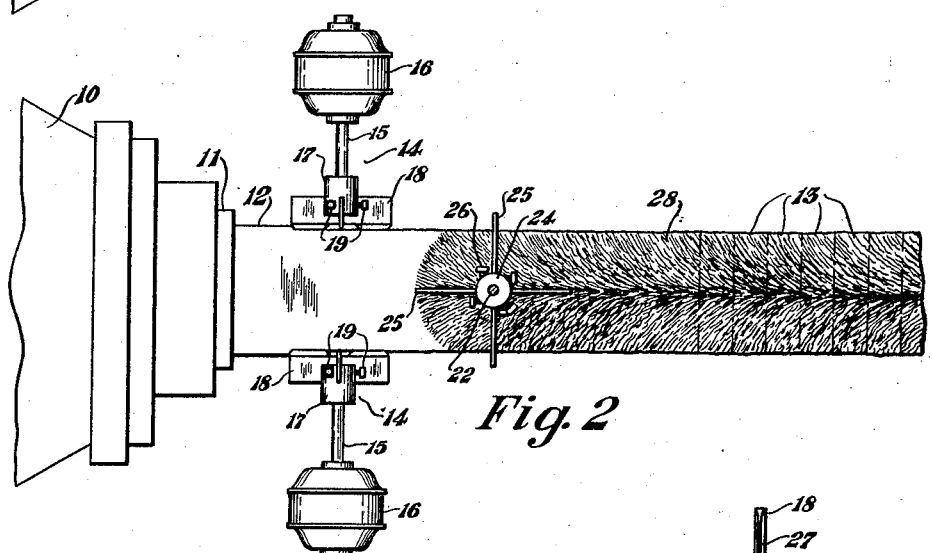
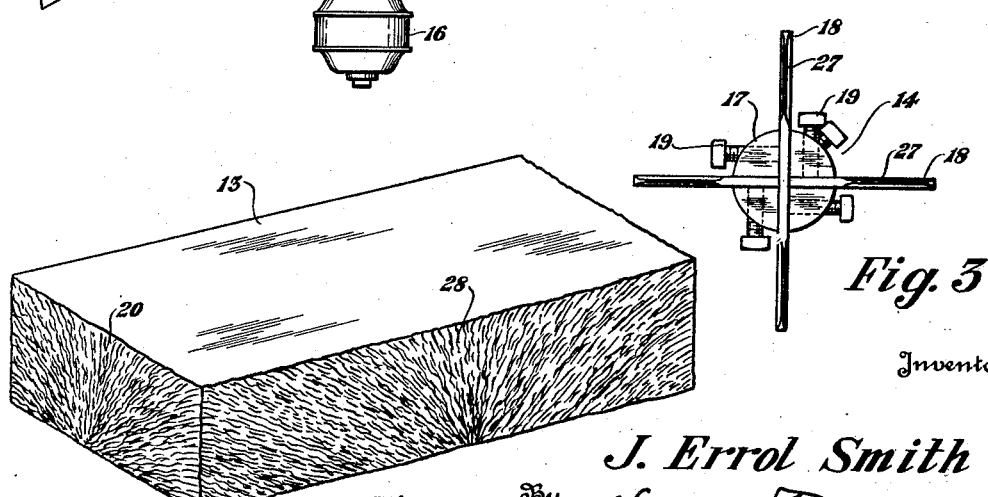
Inventor
J. Errol Smith
By Harry Frease
Attorney Patented June 9, 1931

1,809,572

UNITED STATES PATENT OFFICE

J. ERROL SMITH, OF STONECREEK, OHIO, ASSIGNOR TO THE STONE CREEK BRICK COMPANY, OF STONECREEK, OHIO, A CORPORATION OF OHIO

APPARATUS AND PROCESS FOR TEXTURING BRICK

Application filed January 28, 1929. Serial No. 335,616.

The invention relates to the texturing of bricks and the like, such as are used for the building of dwellings and other buildings.

More particularly the invention relates to the manufacture of bricks by the stiff mud process, in which the bricks, or the like, are formed by forcing moistened clay or ground shale through a die, as by an auger, the material being extruded from the die in the form of a continuous column, which is then cut into bricks, tiles or the like by the usual cut-off table.

The bricks produced by this method have an objectionable shine or smoothness of surface, and are so regular and smooth that they produce a monotonous, even wall surface, when laid up in the wall of a building.

To overcome this objectionable smooth and even surface, various methods of surface treatment have been resorted to in the past. A so-called "matt" texture has been produced by means of wires stretched across the mouth of the die, whereby the surface of the column is cut off or removed, leaving a mechanical roughness of surface.

By means of a device very similar to the ordinary lawn or garden rake, the surface of the column has been longitudinally scored, or scratched, producing a brick which is known as the "vertical texture", or "rug texture" brick. Such brick, although they have been used to a great extent in recent years, produce a wall having vertical, parallel grooves, presenting an even and mechanical appearance.

Rotating blades or cutters have also been used to remove a portion of the surface of the column, leaving a roughened surface upon the finished brick. Such blades or cutters rotate upon an axis parallel with the surface of the column, upon which they operate, thus also producing a symmetrical or mechanical effect present in the other textures above referred to.

The object of the present improvement is to provide means for texturing, or roughening the surfaces of bricks, tiles and the like, in such a manner that the finished bricks, and the walls built therefrom, do not have the appearance of mechanical roughness.

A further object is to produce a roughened surface upon the brick, or the like, having the appearance of radiating grooves and ribs of irregular shape and form, thus entirely overcoming the mechanical appearance produced by the methods above referred to.

The above and other objects may be attained by the use of rotating cutters or blades, each rotating upon an axis perpendicular to the surface of the column being textured, the working edges of the cutter blades being beveled, and the cutter operating at a slight distance below the original surface of the column.

An embodiment of the invention thus set forth in general terms is illustrated in the accompanying drawings, in which Fig. 1 is a side elevation of a die, showing a column being extruded therefrom, the improved texturing apparatus being shown roughening the surfaces of the column;

Fig. 2, a top plan view of the same;

Fig. 3, an enlarged, bottom plan view of one of the rotary cutters; and

Fig. 4, a perspective view of a brick textured by the improved apparatus.

Similar numerals refer to similar parts throughout the drawings.

A portion of a brick machine of usual and well known construction, is shown at 10, provided, as in usual practice, with the ordinary die 11, from which the clay, or shale, is extruded in a column, as indicated at 12.

This column is adapted to be then cut into bricks, as indicated at 13, in the usual manner, by the ordinary cut-off table (not shown). The above is all usual and customary in ordinary practice, and in itself forms no part of the present invention.

When the column is severed into bricks, by means of the cut-off table, the face and end surfaces of the bricks are formed from the top and side surfaces, respectively, of the column, and it is the texturing of these surfaces to which the invention pertains.

I prefer to first texture the sides of the column, and this is accomplished by a pair of opposed, rotary cutters, operating upon the sides of the column near the point where the same emerges from the die. These side cutters being thus opposed, a uniform width of column is assured.

These side cutters are shown generally at 14, and each may comprise a shaft 15, perpendicular to the surface to be textured, and rotated by any suitable means such as a motor 16, a head 17, and one or more cutting blades 18 removably secured in the head, as by the set screws 19.

Each of the side cutters is mounted for adjustment toward and from the column, so that the cutter blades may be entered the desired distance, preferably about one-eighth of an inch, beneath the surface of the column.

These side cutters may be rotated at a speed of about eleven hundred revolutions per minute, under ordinary conditions, this action causing a tearing off of the side surfaces of the column, and producing roughened surfaces having substantially radiating grooves and ribs of irregular shape and position, as shown at 20 in Fig. 1, and in the finished brick illustrated in Fig. 4.

For the purpose of producing a similar texture upon the top surface of the column, a top cutter, similar to the side cutters above described, but of larger diameter, is arranged to operate upon the top of the column, preferably beyond the side cutters, and opposed to the endless carrier table 21, which is usually provided beneath the column at this point.

This top cutter may comprise the vertical shaft 22 driven, as by the motor 23, preferably at a speed of about four hundred and fifty revolutions per minute, and provided with the head 24 upon which one or more cutter blades 25 may be detachably mounted as by the set screws 26. This rotating cutter is substantially the same as the side cutters above described excepting that the blades are longer, as illustrated in the drawing, in order to engage across the entire width of the top surface of the column, as shown in Fig. 2.

The top cutter is also adjustable toward and from the column so that the beveled cutting edges 27 of the blades may be inserted to the desired depth, preferably about one-eighth of an inch, below the original surface of the column to remove this amount of material and texture or roughen the top surface of the column in the same manner as above described as to the side surfaces thereof, producing the textured surface shown at 28 in Figs. 2 and 4 formed of radiating ribs and grooves of irregular shape and spacing.

The particular bevel upon the edges of the cutter blades and the fact that they are inserted beneath the original surface of the column tears the outer surface from the column and pulls the material, producing these radiating irregularly shaped and spaced ribs and grooves.

Although the particular construction and arrangement of cutters herein illustrated and described is especially adapted for accomplishing the purposes of the invention, it should be understood that the construction and arrangement of the cutters may be considerably changed without departing from the invention.

Briefly the invention consists in the texturing of the bricks and the like by rotating a cutter or blade over the surface to be textured in a plane parallel with said surface.

The finished brick or the like produced with this apparatus and method has a very pleasing appearance which entirely overcomes the mechanical effect present in the other forms of textured brick above referred to as the ribs and grooves are neither regularly shaped nor evenly spaced and are not located in vertical or horizontal rows but radiate throughout the entire surface of the brick, producing in a wall built of the brick, the general effect of a sunset.

The particular effect produced is due to the fact that the rotary cutters each rotates on an axis perpendicular to the surface being textured and the cutter blades thus being radial to the surface tear through the column and pull the finished surface, producing the radial irregularly shaped and spaced ribs and grooves thereon.

I claim:

1. A texturing apparatus for a plastic column, and the like, including opposed cutters having radial blades and mounted upon axes perpendicular to opposite side surfaces of the column, and means for rotating the cutters upon their axes.

2. A texturing apparatus for a plastic column, and the like, including opposed cutters having radial blades and mounted upon axes perpendicular to opposite side surfaces of the column and movable toward and from the column, and means for rotating the cutters upon their axes.

3. The method of texturing a moving plastic column and the like which consists in rotating a head containing blades on an axis at right angles to the surface to be textured, the blades moving in a plane parallel with and under said surface to produce a texture with irregular lines radiating over the entire surface of the column, and cutting the column into bricks and the like.

4. The method of texturing a plastic column and the like which consists in subjecting the surface to be textured to the tearing action of blades perpendicular to and rotating in a plane parallel with said surface.

5. The method of texturing a plastic column and the like which consists in subjecting the surface to be textured to the tearing action of blades perpendicular to and rotating in a plane parallel with said surface, said blades rotating about an axis perpendicular to the central portion of said surface.

6. The method of texturing a plastic column and the like which consists in tearing off the outer skin of the surface to be textured by subjecting said surface to rotary scraping forces rotating about an axis perpendicular to the plane of said surface.

In testimony that I claim the above, I have hereunto subscribed my name.

J. ERROL SMITH.